US010343891B2

(12) United States Patent
Murugo Pérez (10) Patent No.: US 10,343,891 B2
(45) Date of Patent: Jul. 9, 2019

(54) LNG NOZZLE SAFETY LOCKING MECHANISM

(71) Applicant: TRANSPORTES HAM, S.L.U., Abrera (ES)

(72) Inventor: Antonio Murugo Pérez, Abrera (ES)

(73) Assignee: TRANSPORTES HAM, S.L.U., Abrera (ES)

( * ) Notice: Subject to any disclaimer, the term of this patent is extended or adjusted under 35 U.S.C. 154(b) by 100 days.

(21) Appl. No.: 15/599,205

(22) Filed: May 18, 2017

(65) Prior Publication Data

US 2017/0334705 A1    Nov. 23, 2017

Related U.S. Application Data

(60) Provisional application No. 62/337,894, filed on May 18, 2016.

(30) Foreign Application Priority Data

Aug. 12, 2016  (EP) ..................... 16183947

(51) Int. Cl.
| | | |
|---|---|---|
| *B67D 7/06* | (2010.01) | |
| *B67D 7/32* | (2010.01) | |
| *B67D 7/42* | (2010.01) | |
| *F17C 5/02* | (2006.01) | |
| *F17C 13/00* | (2006.01) | |
| *F17C 13/04* | (2006.01) | |
| *F16L 37/00* | (2006.01) | |

(Continued)

(52) U.S. Cl.
CPC ............ *B67D 7/3209* (2013.01); *B67D 7/06* (2013.01); *B67D 7/42* (2013.01); *F16L 37/00* (2013.01); *F16L 37/20* (2013.01); *F16L 37/24* (2013.01); *F17C 5/02* (2013.01); *F17C 13/00* (2013.01); *F17C 13/04* (2013.01); *F17C 2205/037* (2013.01); *F17C 2205/0326* (2013.01); *F17C 2205/0329* (2013.01); *F17C 2205/0373* (2013.01); *F17C 2205/0376* (2013.01)

(58) Field of Classification Search
CPC ......... B67D 7/3209; B67D 7/42; B67D 7/06; F16L 37/00; F16L 37/20; F16L 37/24; F17C 5/02; F17C 13/00; F17C 13/04; F17C 2205/0373; F17C 2205/0326; F17C 2205/0329; F17C 2205/037; F17C 2205/0376

See application file for complete search history.

(56) References Cited

U.S. PATENT DOCUMENTS 3,472,482 A * 10/1969 Gardner .................. F16K 31/52
                                                              251/149.5
3,842,614 A * 10/1974 Karcher ................... F16L 37/23
                                                              137/614.04

(Continued)

*Primary Examiner* — Nicolas A Arnett (57) ABSTRACT

The present invention relates to a coupling for a connecting a LNG nozzles to a LNG vehicle tank receptacle and their connection apparatus to a LNG vehicle tank for fueling.

The invention comprises a double connection system to provides additional safety to a LNG Nozzle Locking Mechanism for being locked into a LNG receptacle on a vehicle tank, by combining two different locking mechanisms: one the so-called "collet type" locking mechanism with the locking handles, and two the valved receptacle and valved nozzle approach with the rotating handle.

6 Claims, 8 Drawing Sheets

(51) Int. Cl.
*F16L 37/20* (2006.01)
*F16L 37/24* (2006.01)

(56) References Cited

U.S. PATENT DOCUMENTS

| | | | | |
|---|---|---|---|---|
| 4,347,870 A * | 9/1982 | Maldays | ................ | F16L 37/23 |
| | | | | 137/614.05 |
| 5,404,909 A * | 4/1995 | Hanson | ................ | F16L 37/113 |
| | | | | 137/614.06 |
| 5,429,155 A * | 7/1995 | Brzyski | ................ | F16L 37/35 |
| | | | | 137/614.04 |
| 6,945,477 B2 * | 9/2005 | Lambert | ................ | F16L 37/252 |
| | | | | 239/542 |
| 6,981,513 B2 * | 1/2006 | Krywitsky | ................ | F16K 27/07 |
| | | | | 137/614.06 |
| 7,111,641 B2 * | 9/2006 | Marban | ................ | F16L 37/28 |
| | | | | 137/614.03 |
| 7,469,718 B2 * | 12/2008 | Lambert | ................ | A61M 16/08 |
| | | | | 137/614.04 |
| 7,909,365 B2 * | 3/2011 | Krywitsky | ................ | F16K 27/07 |
| | | | | 285/301 |
| 7,988,200 B2 * | 8/2011 | Krywitsky | ................ | F16L 37/113 |
| | | | | 285/312 |
| 8,113,240 B2 * | 2/2012 | Blanchard | ................ | F17C 13/04 |
| | | | | 137/630.14 |
| 8,662,118 B2 * | 3/2014 | Hunt | ................ | B67D 7/423 |
| | | | | 141/198 |
| 8,863,791 B2 * | 10/2014 | Aehle | ................ | F17C 5/02 |
| | | | | 141/198 |
| 8,899,550 B2 * | 12/2014 | Tiberghien | ................ | F16L 31/00 |
| | | | | 137/614.04 |
| 9,791,081 B2 * | 10/2017 | Cosse | ................ | F16L 37/36 |
| 2006/0026969 A1 * | 2/2006 | Brook | ................ | F16L 59/18 |
| | | | | 62/50.7 |
| 2011/0005639 A1 * | 1/2011 | Weh | ................ | F16L 37/121 |
| | | | | 141/311 R |

* cited by examiner

LNG NOZZLE SAFETY LOCKING MECHANISM

TECHNICAL FIELD OF THE INVENTION

The present invention relates to a coupling for connecting a LNG nozzles to a LNG vehicle tank receptacle and their connection apparatus to a LNG vehicle tank for fueling.

BACKGROUND OF THE INVENTION

There are common couplings for LNG transfer from a LNG station or mobile fueling vehicle to an LNG vehicle tank. The acronym LNG means liquified natural gas. Both rely on check valves which can halt flow in ideal situations, but which can fail if the pressure from the tank is too high on disconnect. If he vehicle tank has pressure that is too high compared to the delivery tank, the known coupling systems allow some venting. Both of the known couplings also rely on surface finish and form accuracy as well as high purity of the connecting surfaces in order to connect with small forces. Also the nozzle may be used on numerous vehicles every day and the fine fit and finish required may slip leading to difficulties. This situation is exacerbated by the cold temperatures of the nozzle and receptacle which are in contact with LNG, 196 degrees below 0, which makes the metal brittle and subject to abrasion. All of the components of the connecting parts of the nozzle and receptacle are made of hardened stainless steel for maximum resistance to wear and damage. But that delays rather than prevents damage. Leaking connections, and loss of LNG vapors (methane) from an ill-fitting nozzle is both a safety and environmental issue. The first common coupling is the "J. C. Carter type collet system" that locks over the coupling and its cone shape collet is pushed down over the receptacle and fastened with downward movement and pressure from a pair of locking double scissor handles. The pressure required, and potential loss from scrapings are both issues for long term reliability. This system, based on a standard collets, are not patented.

The other known coupling system is patented, under patent number U.S. Pat. No. 6,945,477. This is the "Kodiak system" which includes a valved receptacle and a valved nozzle. Rollers in the outer collar of the receptacle are received in the helical channels along the nozzle. A notch or detent in each of the channels provides a vent fluid before the nozzle is fully disconnected from the receptacle. The nozzle has a rotating handle assembly to lock in the coupling.

For the remainder of this patent application, locking handles refer to the pull down handles of the nozzle design that lock the collets, rotating handles refer to the handle that rotates to lock the valved receptacle to the valved nozzle.

The current state of art would be satisfactory in most applications. But, however, LNG coupling devices pose challenges:
  One is the material is extremely cold, minus 196 degrees. Leaking material, or blowback out of the vehicle tank can cause injury to operators. This has led to a practice of using an excessive amount of personal protection equipment which operators do not like. Besides, cryogenically approved gloves, operators need to wear a long apron down to the knees and where a helmet with a clear solid shield.
  Two is that methane is a very strong greenhouse gas, its impact on greenhouse gas is 19 times or more of the impact of carbon monoxide. A leak from the fueling operation is not acceptable environmentally.

Other relevant patents related to this invention are next listed: U.S. Pat. No. 3,842,614A filed on 1974 Oct. 22 in the name of Harry H. Hammond, Thomas D. Karcher; U.S. Pat. No. 4,347,870A filed on 1982 Sep. 7 in the name of Ojars Maldus; U.S. Pat. No. 5,429,155A filed on 1994 Jul. 4 in the name of Glen B Bryski, Martine E, Gordon, Patrick K. Griffin John J. Holzinger; U.S. Pat. No. 6,945,477B2 filed on 2005 Sep. 20 in the name of Todd Lambert, Keith J. Anderson; U.S. patent no U.S. Pat. No. 7,111,641B2 filed on 2006 Sep. 26 in the name of Joseph R. Marbon, Steven D. Erickson; U.S. Pat. No. 7,469,718B2 filed on 2008 Dec. 30 in the name of Todd Lambert, Shawn Davis Ellis, Mario Alejandro; U.S. patent application no US20060026969 filed on 2011 Jan. 13 in the name of Thomas Curtis, Brook Samuel, Douglas, Chambers; and U.S. patent application no US20110005639 in the name of Ervin Weh, Wolfgang Web.

In reference to cited U.S. Pat. No. 3,842,614, a coupling arrangement without collets that uses a ball type locking mechanism is described. Purpose of the ball type device is to leave openings between the balls for ice formation so ice can be easily broken without heating the coupling. Arrangement is obsolete but was one of the first LNG patents. Does not combine the two elements of the current invention with a separate coupling lock and collet locking mechanism.

In reference to cited U.S. Pat. No. 4,347,870, a quick disconnect female coupling with a lever operated valve is taught. The lever operates a cam inside the coupling which pulls the valve assembly of the female coupling and pusher a plunger into the valve of the male coupling. A reverse of current technology where the female coupling is the primary device. Does not combine the locking mechanisms of the current invention.

In reference to cited U.S. Pat. No. 5,429,155, the male and female ends both have poppets that combine with and outer seal on the male end sealing the connection. Again not combining the couplet lock with a collet locking mechanism.

In reference to cited U.S. Pat. No. 6,945,477, it has only the one connecting "Kodiak type" mechanism and not the collet type of connecting mechanism.

In reference to cited U.S. Pat. No. 7,111,641, a quick connect system with two connecting mechanism, but in this patent both are ring type connectors, neither is a collet type connector, is described. Furthermore, this patent is not for a cryogenic connector.

Concerning cited U.S. Pat. No. 7,469,718, this patent is for modifications in the sleeve prevent ice build. If allows the female coupler to have gas purging from the methane gas in the tank to prevent icing. While it has a double ring in the coupler itself, it does not act as a double fastening device, but rather to create a cavity for gas purging.

Concerning cited patent application no US20060026969, it deals with an insulating boot on an LNG nozzle to prevent ice build-up. The boot is conFIG.d to go on a standard collet type connecting nozzle and it does provide for a second locking device such as in the device being searched for in this report.

Concerning cited patent application no US20110005639, it is a variation of the standard Parker Hannifin or JC Carter nozzle where the hand lever, this application uses one lever rather than two, is locked into position and needs to be released before opening. This system uses one collet type connecting device, and not the double connection device described herein.

SUMMARY OF THE INVENTION

As mentioned and discussed before, there are conventionally two different methods of locking an LNG nozzle into a LNG receptacle on a vehicle tank:

One is a quick disconnect nozzle similar to JC Carter's 50 GPM nozzles, model #'s 50E 701 models, 1, 2, and 3. This nozzles uses collets which lock over the connector when the handles are pushed down.

The second type of connection device for LNG transfers is called a "Kodiak device" by its manufacturer, which is a coupling device where one end of the coupling, connected to the fueling source is turned into the coupling receptacle on the vehicle tank with the valves automatically open when the coupling device is locked in place.

The present invention is defined in independent claim 1. It is characterized in that comprises a double connection system to provides additional safety to a LNG Nozzle Locking Mechanism for being locked into a LNG receptacle on a vehicle tank.

More particularly, the present invention is to combine two different locking mechanisms: one the so-called "collet type" locking mechanism with the locking handles, and two the valved receptacle and valved nozzle approach with the rotating handle.

This may be accomplished by using a valved receptacle with similar features as the one described in U.S. Pat. No. 6,945,477B2 with the rotating handle small enough to fit underneath the locking handles when they are pushed down to lock the collets in place. The locking handles position when locked may need to be adjusted, so they do not touch the rotating handle in the final position.

Operation of this would call for the valved nozzle section to inserted into the valved receptacle with the two parts locked together with the rotating handle. Then the locking handles for the collet would be pushed down toward the vehicle tank and locked. There would therefore be two locking in place both for safety and to greatly minimize methane releases that would environmentally harmful.

The present invention is a much more safer fueling nozzle that screws into an existing receptacle with a quarter-turn device, before opening the nozzle properly with the locking handles being pushed down (forward) towards the vehicle tank.

As mentioned before, the fueling nozzle comprises an "Ice Breaker" type nozzle, and also a quarter turn bayonet fitting to pull the nozzle against the receptacle before being open, thereby ensuring that the "Ice Breaker" type nozzle is tightly seated against the receptacle before it is opened.

That is to say, the safer fueling nozzle of the present invention comprises two different and subsequent operation steps (either in connecting and disconnecting steps):

In the connecting step, the first step consists in that the operator screws the quarter turn device of the safer fueling nozzle into an existing receptacle, thus fitting to pull the nozzle against the receptacle before being open, thereby ensuring that the "Ice Breaker" type nozzle is tightly seated against the receptacle before it is opened.

Once the first operation of screwing is achieved, then the operator closes the lever to open an internal valve of the nozzle.

Likewise, in the disconnecting step, the first operation consist in that the operator opens the lever to properly open the internal valve of the nozzle.

Once the first operation of opening the lever is achieved, then the operator disscrews the quarter turn device of the safer fueling nozzle in order to move away the fueling nozzle.

Optionally, a protective element may be provided fitted close to the inner rear surface of the quarter turn bayonet, and is adapted to advantageously prevent the gases from reaching the face of the operator. This protective element comprises a portion which has a trunk cone-shape surface, which permits the cited functionality.

This invention has the principal advantage of providing a positive lock to engage the nozzle, and prevents the kickback commonly encountered when disengaging the nozzle.

As a result, the system provides greater safety against unwanted LNG discharges.

It is completely clear that the two improved features: "quarter-turn bayonet" and "lever opening" have not been successfully combined in a nozzle previously, which provides the safety features of the combined nozzle.

The way do the different elements of the present invention interact with each other to make this invention is next explained: The "Ice Breaker" nozzle cannot engage—therefore not open—until the nozzle is properly seated. The degree of safety is enhanced to the point where less personal protective gear may be required for fueling.

Both main elements: "quarter-turn bayonet" and "lever opening" can be manufactured preferably with aluminum or plastic or plastic fiber or stainless Steel or brass. Nevertheless other material can be used, such us components for lighter weight, though life cycle testing would be appropriate.

On the other hand, the manual handles may be replaced by an equivalent actuator cylinder to open and close the nozzle.

DETAILED DESCRIPTION OF PREFERRED EMBODIMENT OF THE INVENTION

Figure 1:
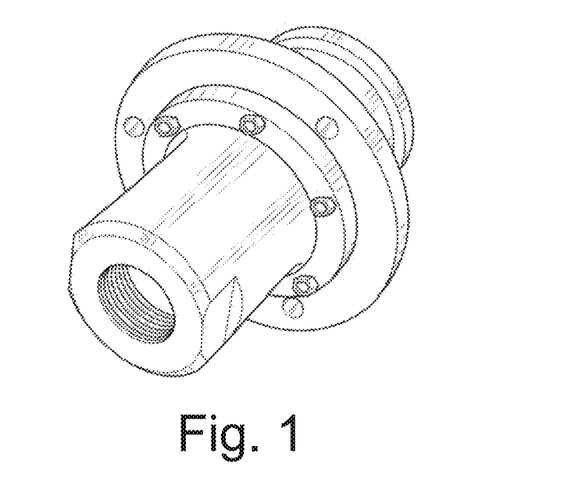
FIG. 1 represents a figure of an LNG vehicle tank receptacle.
Figure 2:
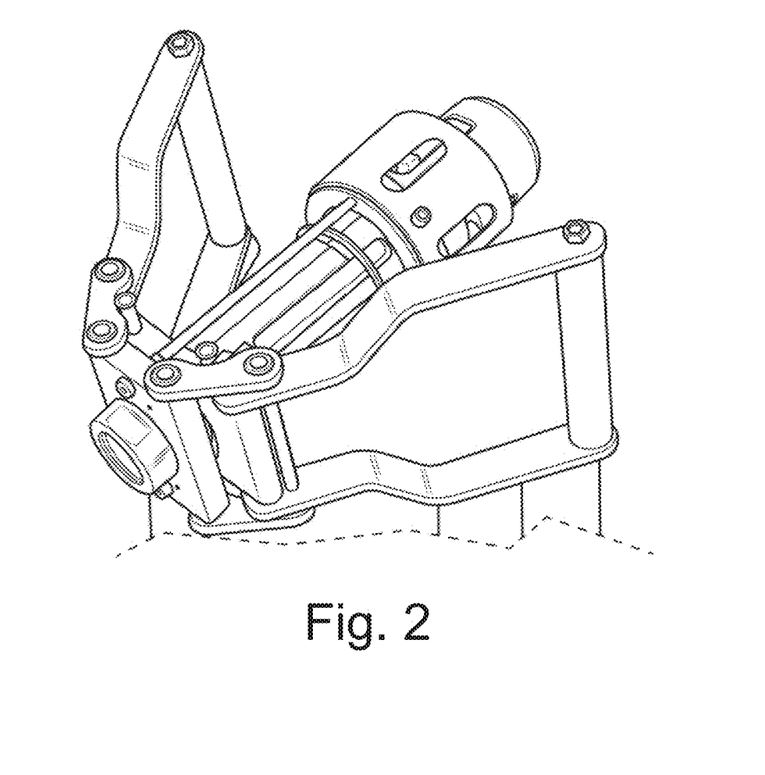
FIG. 2 represents a figure of a known LNG nozzle that is locked in place with collets activated with two locking handles (the so-called "collet type" locking mechanism)
Figure 3:
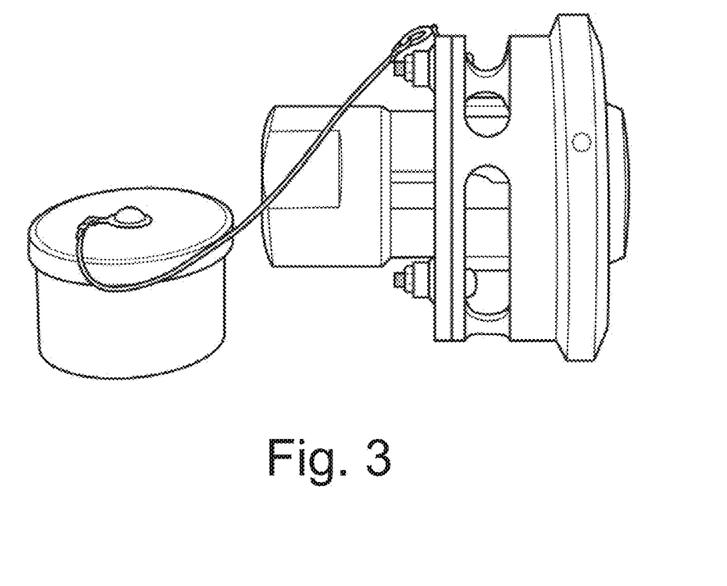
FIG. 3 represents a figure of an LNG valved receptacle.
Figure 4:
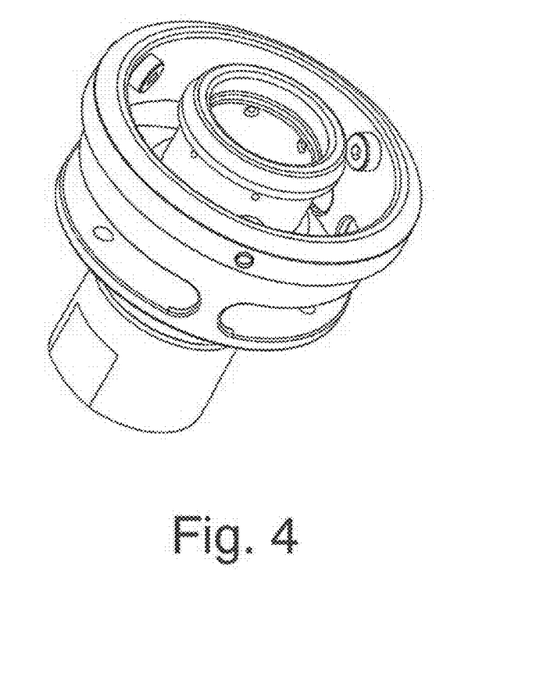
FIG. 4 represents a figure of the LNG valve receptacle from U.S. Pat. No. 6,945,477.
Figure 5:
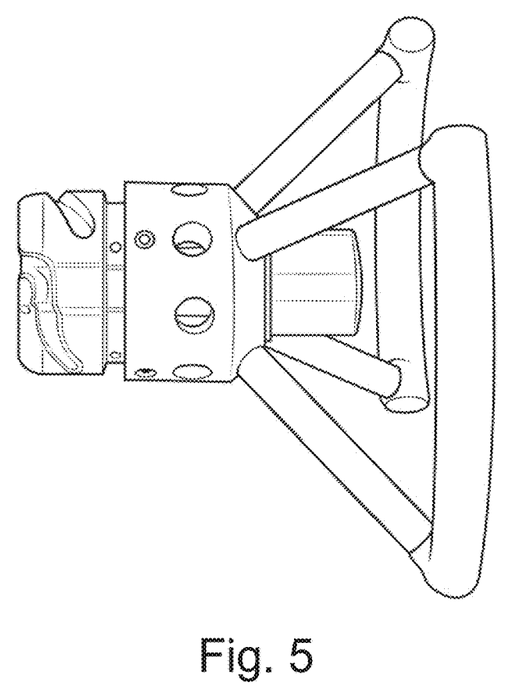
FIG. 5 represents a figure of a known valved LNG nozzle.
Figure 6:
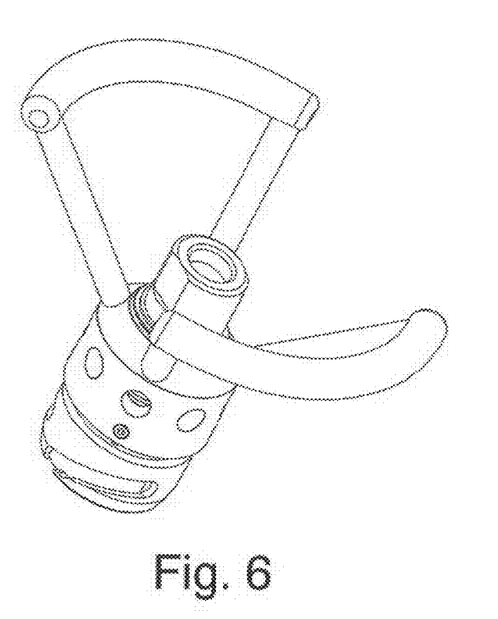
FIG. 6 represents a figure of a valved LNG nozzle from U.S. Pat. No. 6,945,477.
Figure 7:
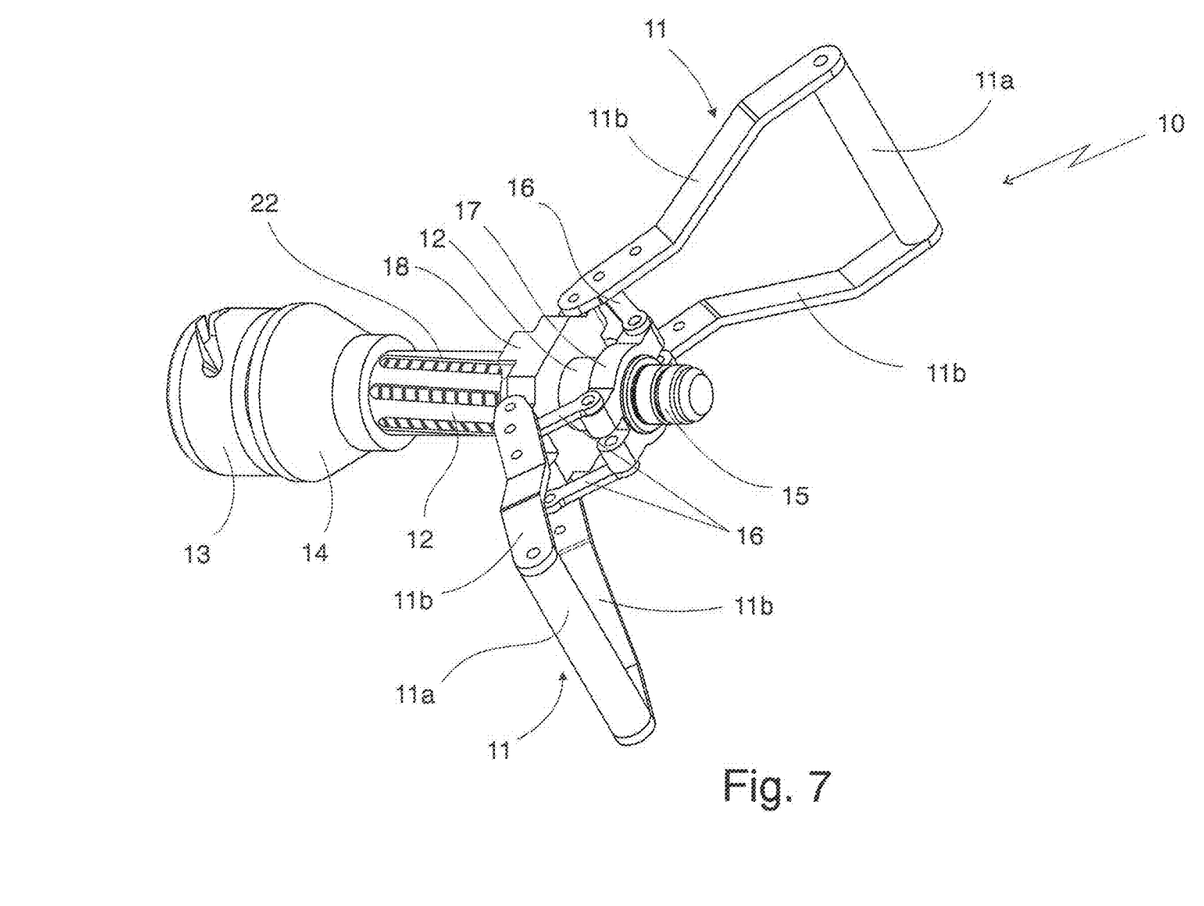
FIG. 7 represents a perspective view of a possible embodiment of the LNG Nozzle Safety Locking Mechanism of the invention in an unlocked position.

As mentioned previously, FIG. 2 represents a figure of a conventional LNG nozzle that is locked in place with collets activated with two locking handles, the so-called "collet type" locking mechanism. This type of nozzle intended for use in NO-VENT (top fill) LNG fuel systems. A key feature of this nozzle is the independent shut-off valve located in the flow path within the nozzle. The operator mates the nozzle to the receptacle by pushing it over the receptacle with handles pulled all the way back. By pushing two handles forward, locking of the nozzle to the receptacle and opening of the internal valves is achieved, and fueling can be started. When fueling is complete, the operator returns the handles back to vent position and waits to complete venting of the residual LNG. Then the nozzle can be unlocked and de-mated by pulling two handles all the way back.

As described previously, a preferable embodiment of the LNG Nozzle Safety Locking Mechanism (10) of the invention is shown in FIGS. 7 to 11.

In those FIGS. 7 to 11 a possible embodiment of locking handles (11) are shown, which presents a double scissor shape with to handles (11a, 11b) and respective counter-handles (16). The operator actuates pushing each handle with each of his hands in order to push the two handles forward to engage and start the fueling operation, and also in order to returns the handles back to disengage and stop the fueling.

The handles (11a, 11b) are connected to a central element (18) and the respective counterhandles (16) are connected to an upper element (17).

The central outer body (12) of the LNG Nozzle Safety Locking Mechanism (10) has a hollow body which extends longitudinally with a cylindrical shape with several openings (22) in a helicoidally direction. In the interior part of the outer body (12), an inner body (24) is disposed which is moved axially by means of the manual locking handles (11a, 11b) and also helped by an elastic element (23) in respect to the outer body (12) which remains unmoving, see FIG. 12.

At the rear part of the nozzle (10), said inner body (24) ends forming a connecting part (15), which is adapted to connect a conventional hose (19).

Furthermore, a valve (26) is disposed at the front part of the inner body (24) of the nozzle (10). This valve (26) is adapted to achieve the receptacle valve (not shown) for opening the gas flow.

At the front part of the central outer body (12), a quarter-turn bayonet (13) is connected.

As it may be appreciated in the attached figures, an optional, an optional protective element (14) is provided fitted close to the inner rear surface of the quarter-turn bayonet (13), which is adapted to prevent the gases from reaching the face of the operator in working position. This protective element comprises a portion which has a trunk cone-shape surface. It preferably has two different portions: a first trunk cone-shape portion and a second cylindrical portion, see FIGS. 8 and 12. The second cylindrical portion is adapted to be connected to one end of the central outer body (12).

Figure 11:
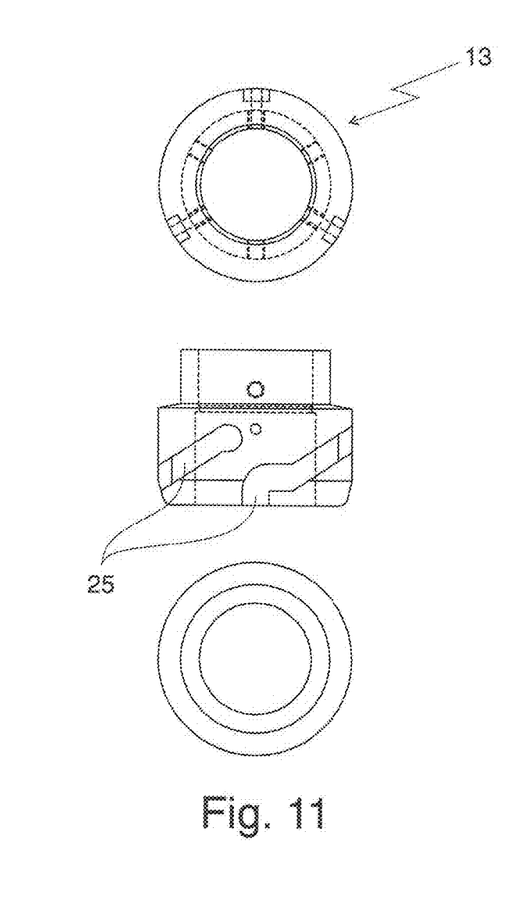
FIG. 11 represents different views of the quarter turn bayonet of the invention.
Figure 12:
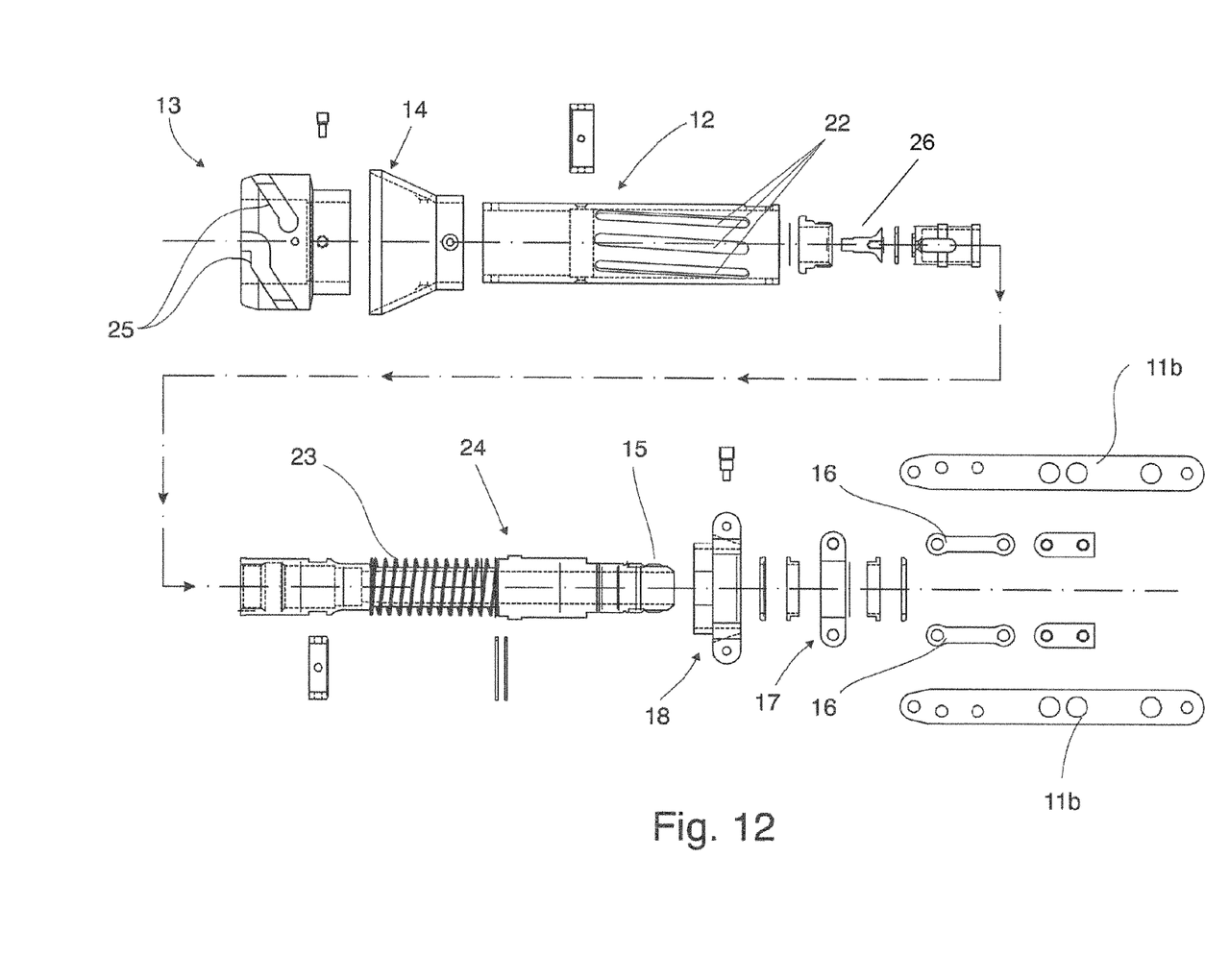
FIG. 12 represents a perspective exploded view of this embodiment of the LNG Nozzle Locking Mechanism of the invention shown in FIG. 7.

As it may be clearly seen especially in FIGS. 11 and 12, the quarter-turn bayonet (13) of the invention comprises in its exterior surface helical slots (25) for the operator to quarter turn the Nozzle Locking Mechanism (10). These helical slots (25) are blind slots, in order to achieve a final position when the operation has end the complete quarter turn. As a concrete and non-limiting example, three different same slots are provided, which engage with the rollers of the receptacle (20-21).

These three same slots are uniformly distributed along the perimeter.

As it may be seen in FIG. 12, the quarter turn bayonet (13) has a cylindrical body, configured by two different portions: a first cylindrical portion provided with the blind crosswise slots in the outer surface, and a second cylindrical portion with a minor diameter that the first portion. Said second portion is adapted to be connected to one end of the central outer body (12).

Figure 8:
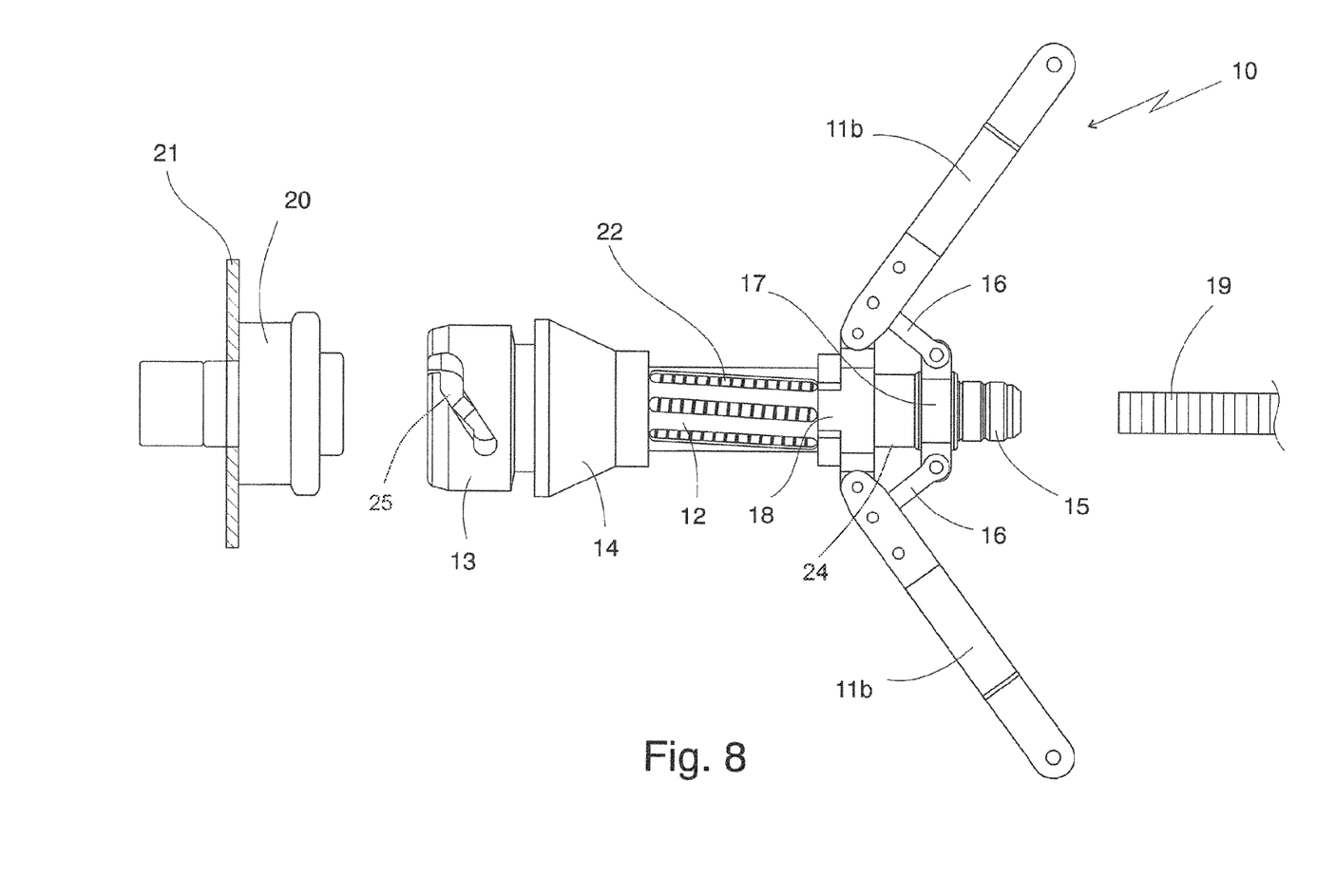
FIG. 8 represents a first lateral view of this embodiment of the LNG Nozzle Locking Mechanism of the invention shown in FIG. 7, in which also a LNG hose and a receptacle is also included in an exploded view.
Figure 9:
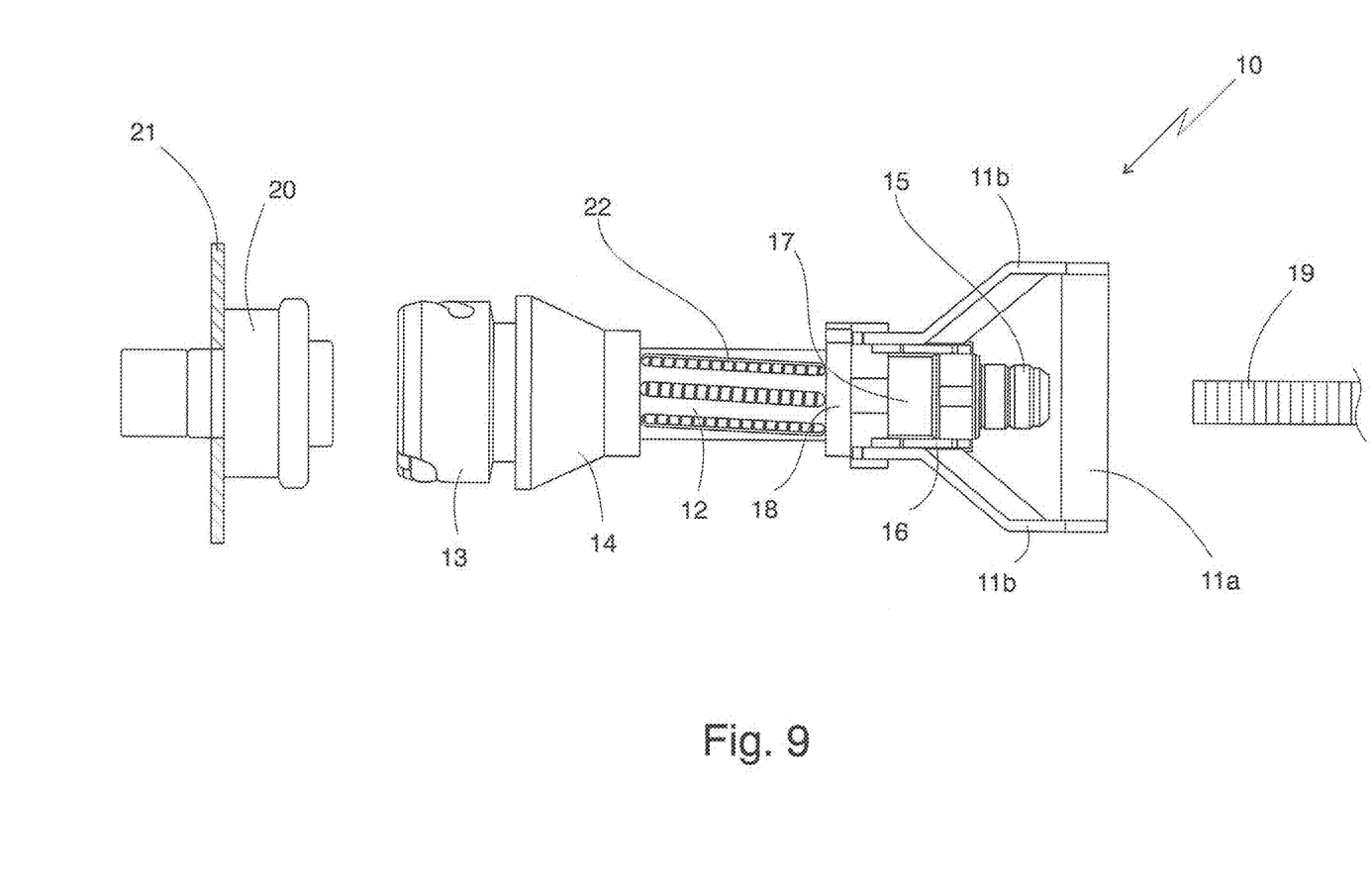
FIG. 9 represents a second lateral view of this embodiment of the LNG Nozzle Locking Mechanism of the invention shown in previous FIG. 8.
Figure 10:
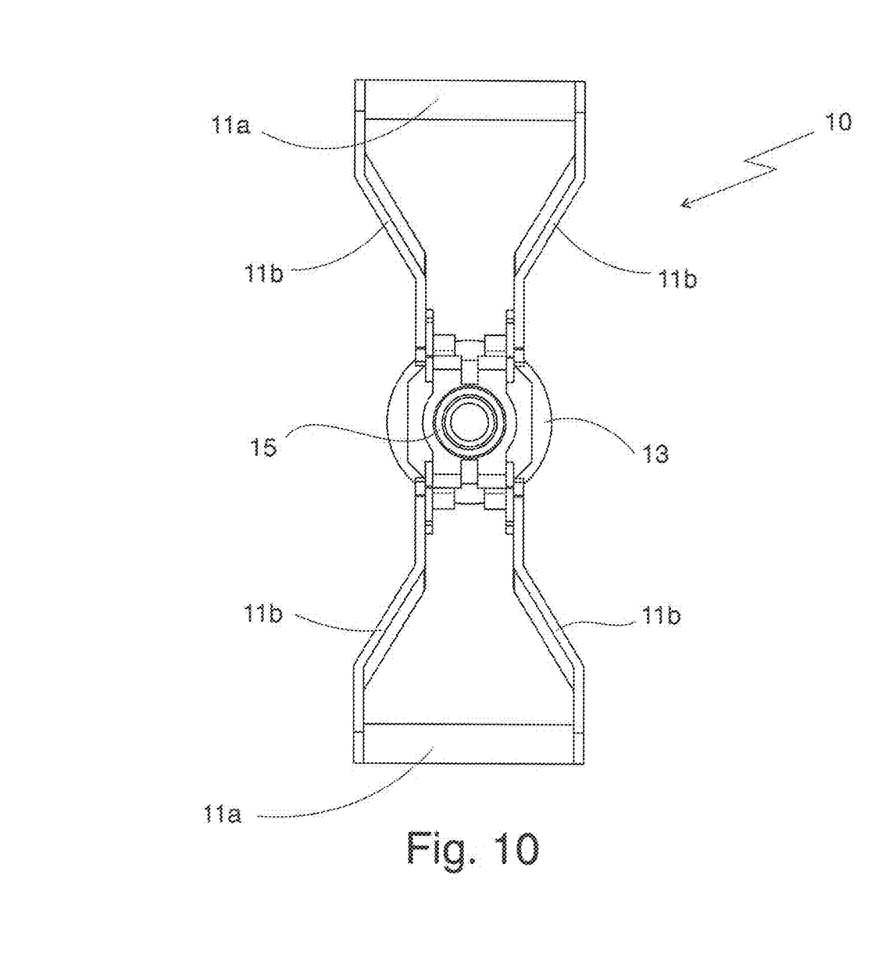
FIG. 10 represents a front view of this embodiment of the LNG Nozzle Locking Mechanism of the invention shown in FIG. 7.

Preferably, the crosswise slots comprise different directions: an first front transversal portion, another longitudinal portion, another crosswise portion, and a longitudinal blind end portion, see FIG. 8. This advantageous directions helps the correct engagement of the quarter turn bayonet against the receptacle (20). This existing receptacle (20) has corresponding means to enter in these blind crosswise slots (25). For example, they may be protruding means.

In case that a protective element (14) is used, the second portion of the quarter-turn bayonet (13) is connected to the protective element (14), see FIG. 8.

The present invention is not limited to the embodiments disclosed, but may be varied and modified within the scope of the following claims.

The invention claimed is:

1. An LNG Nozzle Safety Locking Mechanism for being locked into a LNG valved receptacle on a vehicle tank having a double connection system to provide additional safety to the LNG Nozzle Locking Mechanism, comprising:
   a first connection system including a valved nozzle having collets, the nozzle further comprising
      an outer body, having a hollow body which extends longitudinally;
      an inner body ending in a connecting part, the connecting part being adapted to be connected to a hose, and the inner body being disposed in the hollow body of the outer body and being axially movable with respect to the outer body by pivotally engaging two locking handles, wherein
         the two locking handles being formed by a double scissor shape with two main handles and respective counterhandles, the two main handles each being fixedly connected to a handle fastening element, and the respective counterhandles being fixedly connected to an upper element, wherein the upper element is disposed over the handle fastening element and each main handle is connected to each counterhandle;
      the handle fastening element being fixed to the outer body, and the upper element being fixed to the inner body;
      a valve being disposed at a front part of the inner body opposite the connecting part; and
      an elastic element being disposed on the inner body to assist with axial movement of the inner body relative to the outer body; and
   a second connection system having a quarter-turn bayonet disposed at the front end of the nozzle, the quarter-turn bayonet further comprising an exterior surface having blind slots for accepting the receptacle, wherein
      the nozzle is connectable to the receptacle via a first movement and a second movement, wherein during the first movement the quarter-turn bayonet is screwed into the receptacle, and during a second movement the locking handles are pivotally engaged downwards opening the valve of the nozzle, thereby ensuring that the nozzle is tightly seated against the receptacle before the valve of the nozzle is opened.

2. The LNG Nozzle Safety Locking Mechanism of claim 1, wherein a protective element comprising a portion which has a trunk cone-shape surface is fitted against an inner surface of the quarter-turn bayonet.

3. The LNG Nozzle Safety Locking Mechanism of claim 1, wherein the blind slots of the quarter-turn bayonet are uniformly distributed along the exterior surface of the quarter-turn bayonet.

4. The LNG Nozzle Safety Locking Mechanism of claim 1, wherein the quarter-turn bayonet is manufactured with a material selected from aluminum, plastic, or plastic fiber.

5. The LNG Nozzle Safety Locking Mechanism of claim 1, wherein the blind slots are helical.

6. The LNG Nozzle Safety Locking Mechanism of claim 1, wherein the outer body has a cylindrical shape with several openings.

* * * * *